Patented Aug. 29, 1939

2,171,086

UNITED STATES PATENT OFFICE 2,171,086

PREPARATION OF GOLD FILMS

Charles Stanley Gibson, Kingswood, England

No Drawing. Application April 14, 1938, Serial No. 202,137. In Great Britain June 21, 1937

12 Claims. (Cl. 91—68.3)

This invention relates to the production of coherent films of pure gold and has for object to provide a simple and efficient method of forming films on any desired surface.

The invention is based upon my observation that coherent gold films may be deposited on surfaces by the decomposition in contact therewith of solutions of organic gold compounds having the empirical formula $R_2AuX$ or $R''AuX$ where R represents a univalent hydrocarbon radical, which may be substituted, and $R''$ represents a bivalent hydrocarbon radical, which may be substituted, and X represents a halogen atom, and compounds which may be derived from the above compounds by the action upon them of silver salts of inorganic or organic acids. Examples of such organic gold compounds have been described in the Journal of the Chemical Society of 1907, vol. 91, page 2061; of 1930, page 2531; of 1931, page 2407; of 1934, page 860; of 1935, page 219 and page 1024; of 1936, page 324; of 1937, page 1690, and in the Journal of the American Chemical Society of 1931, vol. 53, pages 2701 and 3053.

According to the invention, a solution comprising an organic gold compound as set out above, or a direct derivative thereof from which the compound may be obtained by simple reactions described in the publications referred to, a monohydric alcohol capable of undergoing direct oxidation, i. e. a primary or secondary monohydric alcohol, and an alkali metal hydroxide or alcoholate is caused to make contact with the surface to be coated with gold.

The alkali metal hydroxide may be employed in aqueous or alcoholic solution and may be supplied by a substance or substances which give rise to it under the conditions of the reaction, for example by an alkali metal phenate, which yields the alkali metal hydroxide in the presence of water. Preferably the alkali metal hydroxide or alcoholate is employed in the proportion of at least one molecule thereof to each atom of gold in the organic gold compound. While satisfactory results are obtained with alkali metal hydroxide, alkali metal alcoholate is preferred in actual practice in many cases.

Monohydric alcohols which are particularly suitable for use in carrying out the invention are the primary alcohols, especially ethanol. Examples of other suitable monohydric alcohols are methanol, n-propanol, iso-propanol, n-butanol, benzyl alcohol. Other monohydric alcohols which are capable of undergoing direct oxidation, aliphatic or cyclic, may, of course, be employed but the availability of the above mentioned alcohols as commercial products makes them the most convenient media. The alcohols may be employed in admixture.

The monohydric alcohol or alcohols employed may be diluted with one or more miscible indifferent liquids which dissolve the compound, for example acetone, tertiary butyl alcohol, benzene; and water may be present so long as the quantity is insufficient to bring about precipitation of the gold compound. In selecting a diluent, however, the effect on the course of the reaction should be determined, for it has been found that the precipitation of gold may be prevented by addition of some compounds to the reaction medium, in particular, glycol and glycerol.

The following are examples of gold compounds which I have prepared and found suitable for the process of my invention:—

(1) Compounds of the empirical formula $R_2AuX$

Diethylmonochlorogold, $[(C_2H_5)_2AuCl]_2$
Diethylmonobromogold, $[(C_2H_5)_2AuBr]_2$
Diethylmonoiodogold, $[(C_2H_5)_2AuI]_2$ and their homologues.
Dicyclohexylmonochlorogold, $[(C_6H_{11})_2AuCl]_2$
Dicyclohexylmonobromogold, $[(C_6H_{11})_2AuBr]_2$
Dicyclohexylmonoiodogold, $[(C_6H_{11})_2AuI]_2$
Dibenzylmonochlorogold, $[(C_7H_7)_2AuCl]_2$
Dibenzylmonobromogold, $[(C_7H_7)_2AuBr]_2$
Dibenzylmonoiodogold, $[(C_7H_7)_2AuI]_2$
Di(phenylethyl) monobromogold,
$[(C_6H_5.CH_2.CH_2)AuBr]_2$ (a) Examples of compounds prepared from the above by the action of the silver salt of an organic acid:

Diethylmonocyanogold,
$[(C_2H_5)_2AuCN]_4$ and its homologues.
Dibenzylmonocyanogold, $[(C_7H_7)_2AuCN]_4$
Dicyclohexylmonocyanogold, $[(C_6H_{11})_2AuCN]_4$ (b) Examples of compounds prepared from the compounds (1) by the action of the silver salt of an inorganic acid:

Tetraethylmonosulphatodigold,
$(C_2H_5)_2Au.SO_4.Au(C_2H_5)_2$
Tetra(phenylethyl) monosulphatodigold,
$(C_6H_5.C_2H_4)_2Au.SO_4.Au(C_2H_4.C_6H_5)_2$ (2) Compounds having the empirical formula, $R''AuX$ Bis(cyclopentamethylenemonobromogold),
$(C_5H_{10}AuBr)_2$
Bis(cyclodecamethylenemonobromogold),
$(C_{10}H_{20}AuBr)_2$ The following are examples of parent substances, that is, of compounds from which the compounds employed according to the invention may be derived by simple reactions:—

Monoaminodiethylmonobromogold,
$(C_2H_5)_2AuBrNH_3$
Monopyridinodiethylmonobromogold,
$(C_2H_5)_2AuBrNC_5H_5$
Monoethylenediaminodiethylgold bromide,
$[(C_2H_5)_2Auen]Br$
Monoethylenediaminodi-n-propylgold bromide,
$[(C_3H_7)_2Auen]Br$
Monoethylenediaminodi-i-propylgold bromide,
$[(C_3H_7)_2Auen]Br$
Monoethylenediaminodi-n-butylgold bromide,
$[(C_4H_9)_2Auen]Br$
Monoethylenediaminodibenzylgold bromide,
$[(C_7H_7)_2Auen]Br$
Monoethylenediaminotetra-n-propyldibromodigold, $(C_3H_7)_2BrAu.en.AuBr(C_3H_7)_2$
Monoethylenediaminotetraethyldicyanodigold,
$(C_2H_5)_2(CN)Au.en.Au(CN)(C_2H_5)_2$
Monoethylenediaminotetra-n-propyldicyanodigold, $(C_3H_7)_2(CN)Au.en.Au(CN)(C_3H_7)_2$
Monoethylenediaminodiethylgold aurocyanide,
$[(C_2H_5)_2Au.en]Au(CN)_2$
Monoethylenediaminodi-n-propylgold aurocyanide, $[(C_3H_7)_2Au.en]Au(CN)_2$
where "en"=ethylenediamine, $NH_2.C_2H_4.NH_2$
Monoethyldibromogold, $(C_2H_5)_2BrAu.AuBr_3$
Mono-n-propyldibromogold, $(C_3H_7)_2BrAu.AuBr_3$
Monobenzyldibromogold, $(C_7H_7)_2BrAu.AuBr_3$
Monocyclohexyldibromogold, $(C_6H_{11})_2BrAu.AuBr_3$ The compounds employed according to the invention may be prepared from the above parent substances containing ammonia pyridine or ethylene-diamine by treatment with sufficient hydrochloric or hydrobromic or sulphuric acid to react with or neutralise the basic constituent of the molecule. From the other parent substances the compounds employed according to the invention may be prepared by treatment either with sufficient hydrochloric or hydrobromic acid or alkali chloride or bromide necessary to combine with the gold tribromide constituent of the molecule.

Gold may be deposited according to the invention upon any desired surface, for example on surfaces of glass, concave, convex, spherical, flat, frosted, on silica, on the textiles, natural silk, viscose, acetate rayon, cotton, wool, on paper, on mica, on vitreous enamel, on porcelain and china, on synthetic resins, e. g. that known under the registered trade-mark "Bakelite", on wood, e. g. oak, on metals, for example copper, nickel, aluminum, zinc magnesium, on alloys, for example stainless steel, brass, magnalium, on wax, for example paraffin wax.

The rate of deposition under any given conditions is not the same on all surfaces. On surfaces of paraffin wax the rate of deposition is much less than on the other surfaces mentioned. Advantage may be taken of this property of paraffin wax to confine, to a large extent, deposition of gold to part of the surface in contact with a solution of the invention, by coating other parts with paraffin wax. Thus in applying a gold film to articles or materials, which can only be treated conveniently by being suspended in the solution, a vessel coated on the interior with paraffin wax may be used, and the heavier gold deposit will be obtained on the article. The gold which may have become deposited on the wax paraffin wax may be recovered therefrom either by mechanical and/or chemical methods.

The thickness of the gold film deposited in accordance with the invention may be varied by varying the quantity of gold in solution. On the basis that an amount of the gold compound, which will yield 0.1932 gram of gold, will give a gold film of substantially $0.1\mu$ in thickness on an area of 1000 square centimetres, the quantity of gold compound required to give approximately a desired thickness of film on a definite area in contact with or confining the solution may be determined.

The process of the invention is conveniently carried out at ordinary temperatures, although increased rates of deposition may be obtained by operating at raised temperature. Care must be exercised, however, so as to avoid the use of temperatures at which the gold compounds will decompose spontaneously. Rate of deposit of the gold may also be governed to some extent by control of concentration of the gold compound, dilute solutions requiring a longer time than more concentrated solutions.

The following examples illustrate several convenient modes of carrying the invention into effect, the parts being by weight.

*Example I*

To deposit a gold film on the inner surface of a glass or silica vessel, a solution is prepared by dissolving 0.335 part of diethylmonobromogold in 40 parts of ethanol and to the solution is added 0.08 part of sodium hydroxide dissolved in 2 parts of water. The mixture is preferably well shaken and the resulting solution introduced into the glass or silica vessel the inner surface of which has been cleaned. The solution is allowed to remain in the vessel at ordinary temperature until the gold is deposited as a film on the surface of the vessel which has made contact with the solution. The deposition begins in from five to ten minutes and is complete in from 25 to 30 minutes. After the deposition, the residual solution is removed and the film washed, for example with successive quantities of ethanol or with water, ethanol and then ether, and allowed to dry.

*Example II*

A plane face of a circular flat piece of glass is coated in the following manner. The plate of glass, after the cleaning of the surface which it is desired to coat, is embedded in paraffin wax in a flat circular dish slightly larger than the plate, so that only the cleaned surface of the plate is exposed. The inner sides of the dish are also preferably coated with paraffin wax to reduce the deposition of gold on parts other than the exposed surface of the piece of glass. A solution of 0.18 part of diethylmonobromogold in 32 parts of ethanol, with which has been incorporated 0.0731 part of sodium ethylate dissolved in 1.1 parts of ethanol, is poured into the dish on to the exposed surface of the piece of glass and preferably a loose cover is placed on the dish. The dish and contents are then gently rocked for about thirty minutes during which time the gold will be deposited chiefly upon the surface of the plate. The residual solution is then removed and the interior of the dish with the piece of glass in position is washed three times with ethanol and allowed to dry. The flat piece of glass is then removed from the In coating a circular flat piece of glass of, say, 17 centimetres in diameter in this way to obtain a film of about 0.2μ in thickness, the quantity of diethylmonobromogold required would be 0.18 gm.

Example III

A solution is prepared by dissolving 2 parts of diethylmonobromogold in 160 parts of ethanol and mixing with it a solution of 0.812 part of sodium ethylate in 10.6 parts of ethanol. The resulting solution is poured into a glass globe having a clean inner surface and the globe is gently rotated so that each part of the inner surface of globe in turn makes contact with the solution while the deposition of gold proceeds. The deposition of the film begins in about seven minutes and after 40 minutes is complete over the interior of the globe, when the solution may be removed and the interior of the globe washed in the manner described above.

Example IV

The deposition of gold upon textile materials is illustrated by the following treatment of a piece of silk fabric.

A solution of 0.11 part diethylmonobromogold in 32 parts of ethanol with which is thoroughly mixed a solution of 0.0447 part of sodium ethylate in 1.5 parts of ethanol is placed in a vessel capable of easily accommodating the silk fabric, the inner surface of which vessel has been coated with paraffin wax. The silk fabric is submerged and suspended in the solution in such a manner that it does not touch the sides of the vessel and is kept there for about two hours, during which time it may be maintained stationary or very slowly rotated. The vessel is preferably provided with a loose cover. The gold will be deposited chiefly on the silk, which may be washed thoroughly in ethanol and allowed to dry.

Example V

A solution is prepared from 0.1 part of diethylmonobromogold dissolved in 16 parts of ethanol and 0.0406 part of sodium ethylate dissolved in 1.2 parts of ethanol in the manner described in the foregoing examples and the solution poured into a vessel made of a synthetic resin, for example, that known under the registered trade-mark "Bakelite", part of the base of which is covered with paraffin wax. The vessel is loosely covered and allowed to remain stationary for 45 minutes during which time the gold is deposited in a coherent film on the vessel in contact with the solution. Gold is deposited to a less extent on the wax and may be readily removed therefrom by gentle rubbing.

Example VI

A piece of freshly planed seasoned oak having a surface area of 40.5 square centimetres is made the base of a cell with glass sides the interior surfaces of which are coated with paraffin wax. 0.04 part of diethylmonobromogold is dissolved in 8 parts of ethanol and to this is added 0.0162 part of sodium ethylate contained in 0.4 part of ethanol. The mixed solution is poured over the surface of the wood and allowed to remain in contact with it during 45 minutes. The solution is then removed and the wood washed thoroughly in the manner described above. A coherent gold film is formed on the wood.

Example VII

A piece of aluminium having a curved surface is cleaned just before use by gently rubbing with clean cotton wool, which had been immersed in a cold and very dilute solution of sodium hydroxide, and then washed with water.

0.05 part of diethylmonobromogold is dissolved in 80 parts of ethanol and to this is added 0.023 part of sodium ethylate contained in 0.6 part of ethanol. This mixed solution is poured into a suitable vessel the inner surface of which had been covered with a layer of paraffin wax. The aluminium is suspended and slowly rotated in this solution for one hour and then removed and washed with ethanol in the manner described above. The surface of the aluminium is covered with a coherent film of gold.

Example VIII 0.05 part of diethylmonobromogold dissolved in 20 parts of ethanol and mixed with 0.0203 part of sodium ethylate contained in 0.4 part of ethanol is poured into a clean stainless steel, circular dish. The loosely covered dish and contents are gently rocked for thirty minutes, the solution removed and the dish washed in the manner described above. A gold film is found to be deposited on the surface which had been in contact with the solution.

Example IX 0.35 part of di-n-propylmonocyanogoid is dissolved in 8.0 parts of ethanol by warming to 50° C. The solution becomes cloudy on cooling to the ordinary temperature. To this cloudy solution is added 0.184 part of sodium ethylate contained in 0.8 part of ethanol and on thorough mixing the solution becomes clear. The solution is transferred to a clean glass vessel and allowed to stand at the ordinary temperature. A film of gold begins to deposit slowly and continues to form during three hours.

Example IXa

A similar result to that in Example IX is obtained when sodium hydroxide in aqueous solution in exactly equivalent amount is used instead of sodium ethylate in ethanol, all other conditions being the same.

Example IXb 0.2 part of the compound of Example IX is dissolved in 2.6 parts of benzene and to this is added 0.088 part of sodium ethylate contained in 2.9 parts of ethanol. The mixed solution is transferred to a clean glass vessel and allowed to remain at the ordinary temperature. A film of gold is deposited slowly and continues to develop during four hours.

Example X 0.5 part of tetraethylmonosulphatodigold is dissolved in 8 parts of ethanol and to this solution is added 0.224 part of sodium ethylate contained in 0.8 part of ethanol. The mixture is transferred to a clean glass vessel on the sides of which a gold film is deposited, where the solution makes contact with the glass, in twenty five to thirty minutes.

Example XI 0.1 part of diethylmonobromogold is dissolved in 16 parts of n-butyl alcohol and mixed with 0.0406 part of sodium ethylate contained in 2 parts of ethanol in a clean glass vessel. The solution darkens and a film begins to deposit on the surface in contact with the solution in about thirteen minutes and continues to form during some hours.

Example XIa 0.1 part of diethylmonobromogold is dissolved in 16 parts of n-butyl alcohol and to this solution in a glass vessel is added 0.0573 part of sodium n-butylate contained in two parts of n-butyl alcohol. The deposition of the film takes a little longer to begin than in the previous case, but after some 50 minutes shows little difference.

Example XII 0.1 part of diethylmonobromogold is dissolved in a clean glass vessel in 20 parts of benzyl alcohol and this is mixed with 0.0406 part of sodium ethylate contained in two parts of ethyl alcohol. The mixture becomes dark coloured almost immediately and within two minutes a gold film begins to form on the glass where the solution makes contact with the vessel.

Example XIII 0.25 part of diethylmonobromogold is dissolved in 40 parts of i-propanol contained in a clean glass vessel and to this solution is added 0.06 part of sodium hydroxide contained in three parts of water. The mixed solution becomes rapidly dark coloured and a gold mirror begins to form on the surface in contact with the solution and is complete within one hour.

Example XIV 0.1 part of diethylmonobromogold is dissolved in 16 parts of ethanol and to this is added 0.07 part of sodium phenate contained in a mixture of 2 parts of ethanol and 0.7 part of water. The mixed solution is transferred to a clean glass vessel in which a film of gold begins to form slowly and continues to develop during several hours on the glass where the solution makes contact with it.

Films prepared according to the invention are brilliant yellow by reflected light and by transmitted light exhibit the usual colours of gold films.

I claim:

1. The process of depositing a coherent film of gold upon a surface according to which the surface is contacted with a solution comprising a monohydric alcohol capable of undergoing direct oxidation, at least one compound of the group consisting of alkali metal hydroxides and alcoholates, and at least one organic gold compound of the group consisting of compounds which have the empirical formula $R_2AuX$ and compounds having the empirical formula $R''AuX$, where R represents a univalent hydrocarbon radical which may be substituted, $R''$ represents a bivalent hydrocarbon radical which may be substituted and X represents a halogen atom, and compounds which are derived from organic gold compounds of the said empirical formulae by the action thereon of a silver salt.

2. The process of depositing a coherent film of gold upon a surface according to which the surface is contacted with a solution comprising a monohydric alcohol capable of undergoing direct oxidation, at least one compound of the group consisting of alkali metal hydroxides and alcoholates, and at least on organic gold compound of the group consisting of compounds which have the empirical formula $R_2AuX$ and compounds having the empirical formula $R''AuX$, where R represents a univalent hydrocarbon radical which may be substituted, $R''$ represents a bivalent hydrocarbon radical which may be substituted and X represents a halogen atom, and compounds which are derived from organic gold compounds of the said empirical formulae by the action thereon of a silver salt, the compound of the group consisting of alkali metal hydroxides and alcoholates being employed in the proportion of at least one molecule thereof to each atom of gold in the organic gold compound.

3. The process of depositing a coherent film of gold claimed in claim 1 wherein the monohydric alcohol employed is ethanol.

4. The process claimed in claim 1 wherein the solution comprises as diluent an indifferent liquid miscible with the alcohol employed.

5. The process of depositing a coherent film of gold upon a surface according to which the surface is contacted with a solution comprising a monohydric alcohol capable of undergoing direct oxidation, at least one of the group consisting of alkali metal hydroxides and alcoholates and diethylmonobromogold.

6. The process of depositing a coherent film of gold upon a surface according to which the surface is contacted with a solution comprising a monohydric alcohol capable of undergoing direct oxidation, at least one of the group consisting of alkali metal hydroxides and alcoholates and bis(cyclopentamethylenemonobromogold).

7. The process of depositing a coherent film of gold as claimed in claim 1 in which any surface or surfaces exposed to the solution on which gold is not desired is or are covered with a material on which gold is deposited less readily than on the surfaces on which gold is required to be deposited.

8. The process of depositing a coherent film of gold as claimed in claim 1 in which any surface or surfaces exposed to the solution on which gold is not desired is or are covered with paraffin wax.

9. The process of depositing a coherent film of gold upon a surface according to which the surface is contacted with a solution comprising a monohydric alcohol capable of undergoing direct oxidation, and diethylmonobromogold together with at least one of the group consisting of alkali metal hydroxides and alcoholates in the proportion of at least one molecule thereof to each atom of gold in diethylmonobromogold.

10. The process of depositing a coherent film of gold upon a surface according to which the surface is contacted with a solution comprising ethanol and diethylmonobromogold, together with at least one of the group consisting of alkali metal hydroxides and alcoholates in the proportion of at least one molecule thereof to each atom of gold in diethylmonobromogold.

11. The process of depositing a coherent film of gold upon a surface according to which the surface is contacted with a solution comprising a monohydric alcohol capable of undergoing direct oxidation, and tetraethylmonosulphatodigold together with at least one of the group consisting of alkali metal hydroxides and alcoholates in the proportion of at least one molecule thereof to each atom of gold in tetraethylmonosulphatodigold.

12. The process of depositing a coherent film of gold upon a surface according to which the surface is contacted with a solution comprising ethanol and tetraethylmonosulphatodigold, together with at least one of the group consisting of alkali metal hydroxides and alcoholates in the proportion of at least one molecule thereof to each atom of gold in tetraethylmonosulphatodigold.

CHARLES STANLEY GIBSON.